F. P. MURPHEY.
CLUTCH MECHANISM.
APPLICATION FILED FEB. 11, 1909.
954,123.
Patented Apr. 5, 1910.
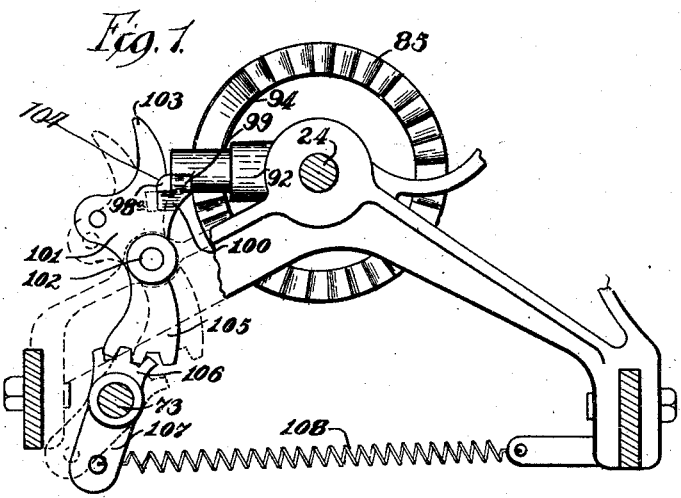
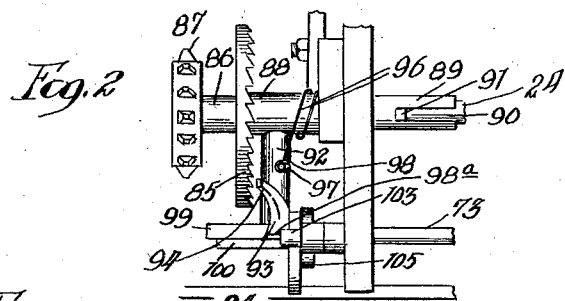
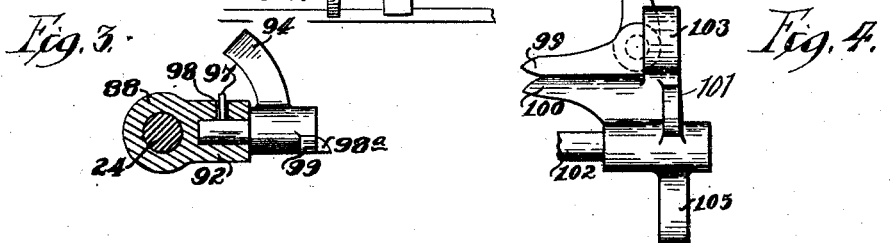
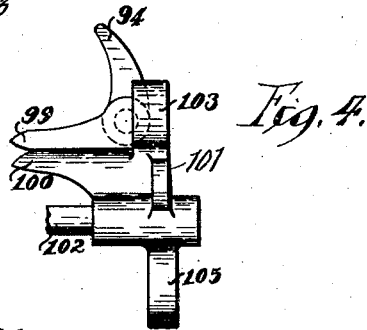
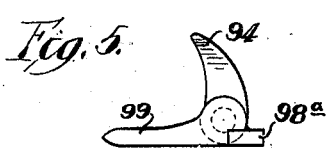
Witnesses:
Inventor:
Frank P. Murphey

UNITED STATES PATENT OFFICE.

FRANK P. MURPHEY, OF DECATUR, ILLINOIS.

CLUTCH MECHANISM.

954,123.  Specification of Letters Patent.  Patented Apr. 5, 1910.

Application filed February 11, 1909. Serial No. 477,328.

*To all whom it may concern:*

Be it known that I, FRANK P. MURPHEY, a citizen of the United States, residing at Decatur, in the county of Macon and State of Illinois, have invented certain new and useful Improvements in Clutch Mechanism, of which the following is a specification.

This invention relates more especially to clutch mechanism used in corn planters for intermittently actuating the several mechanisms involved in the delivery of corn from the hopper through the dropper and valve mechanism to the ground; and has for its principal object to intermittently actuate the several mechanisms in conformity with the advance of the planter across the field.

Further objects will appear from a detailed description of the invention, which consists in the features of construction and combination of parts hereinafter described and claimed.

In the drawings, Figure 1 is a side elevation, showing the frame in section, and the brace carrying the clutch mechanism partly broken away; Fig. 2 a plan view on a reduced scale; and Figs. 3, 4, and 5, details of the clutch dog.

The clutch comprises a ratchet disk 85 having a hub 86, which carries a sprocket wheel 87 adapted to be constantly driven from any suitable portion of the planter mechanism. The disk and hub constitute the constantly driven portion of the clutch, and the intermittently driven portion comprises a sleeve 88 which is keyed onto a tubular shaft 89 adapted to receive the end of a shaft 24, a slot 90 and a key 91 being provided to permit longitudinal adjustment of the shaft 24 within the tubular shaft 89 without loss of rotative effort. The sleeve 88 has laterally projecting therefrom a socket boss 92 which has pivoted within its end a dog 93, the tooth 94 of which is inclined toward the teeth of the ratchet disk 85, the dog being held normally in engagement with the teeth by the action of a spring 96 which is coiled around the sleeve 88, and the free end of which engages an ear 97 secured to the pivoted stem of the dog and outwardly projecting through the slot 98 in the socket lug 92, as shown in Fig. 2. The body of the dog, at the inner side of its axial center, is provided with a forwardly extending cam lug 98$^a$ which is beveled on its upper surface. The cam lug is supplemented by a finger 99 which extends at right angles with respect to the lug and coöperates with a similar finger 100 laterally projecting from a latch plate 101. The latch plate is pivoted near its center 102, and its upper end 103 is beveled on its inner edge to engage the outer end of the lug 98$^a$ when the latter is brought into contact with the beveled surface during the revolution of the dog. The latch is provided, immediately above the finger 100, with a beveled notch 104 adapted to receive the beveled lug, which notch allows the latch plate to snap back from the position shown in dotted lines, into which it is forced by the engagement of the lug into the position shown in Fig. 1 in full lines, in which position the fingers 99 and 100 will engage one another. The fingers afford an increased bearing surface and thereby relieve the lug from strain, to which it would otherwise be subjected.

The latch plate, below its pivotal point, is provided with a rack arm 105, the teeth of which mesh with the teeth of the rack bar 106 keyed on the shaft 73, the lower end 107 of which is engaged by a spring 108, the tension of which serves to hold the upper end of the latch bar normally in position to engage the lug during the revolution of the dog. As the latch bar flies back into normal position under the tension of the spring, the beveled or cam edge of the notch 104 will act upon the beveled surface of the lug 98$^a$, thereby forcing down the lug slightly, which lug, being locked to one side of the axial center of the dog, will exert a sufficient torsional tension to turn the dog sufficiently to release its teeth from engagement with the teeth of the ratchet disk 85. The rocking of the shaft 73, by the passage of a trip wire, serves to throw back the plate 101 into position to release the lug 94 and permit engagement of the tooth of the dog with the ratchet disk for imparting subsequent rotation to the shaft 24.

The clutch mechanism, which serves to impart movement to the pocketed dropper plate, the cam disk and the agitator, is held normally in locked position by the action of the spring 96, which throws the tooth of the dog 93 into engagement with the teeth of the ratchet disk, causing the dog to revolve with the disk and thereby impart a revolution to the working parts of the dropping mechanism. After the rock shaft 73 has been released from the tension of the knotted trip wire, the latch will return to position to disengage the tooth of the dog in contact with the ratchet disk, thereby throwing out the clutch and allowing the working parts to remain stationary until the next knot in the trip wire is reached.

The construction is one which relieves the trip wire from undue strain or tension, and throws the tension onto the clutch mechanism which is rigidly constructed to withstand it.

What I claim as new and desire to secure by Letters Patent is:

1. In a corn planter, the combination of a rotary shaft, a clutch disk loosely mounted on the rotary shaft, a clutch member in the form of a dog, carried by said shaft and adapted to engage the teeth of the clutch disk, a spring for holding the dog in such engagement, a pivoted latch plate, a lug upon the dog, adapted to engage a recess in the latch plate, a stop finger on the dog, adapted to engage a stop finger on the latch plate, and means for moving the latch plate to release the lug and stop finger on the dog from engagement with the recess and stop finger on the latch plate, substantially as described.

2. In a corn planter, the combination of a rotary shaft, a clutch disk loosely mounted on the rotary shaft, a hub fixedly secured to said shaft and having a slot formed in its body, a companion clutch member in the form of a dog, a stem formed on the dog and journaled in the hub, a pin formed in the stem and projecting through the slot in the hub, a spring engaging said pin and holding the dog normally projected toward the clutch disk, a pivoted latch plate, a lug upon the dog, adapted to engage a recess in the latch plate, a stop finger on the dog, adapted to engage a stop finger on the latch plate, and means for moving the latch plate to release the lug and stop finger on the dog from engagement with the recess and stop finger on the latch plate, substantially as described.

FRANK P. MURPHEY.

Witnesses:
J. H. BEATTY,
G. R. DAVIS.